March 19, 1940.   W. R. MILLICAN ET AL   2,194,197
BRAKE OPERATING MECHANISM
Filed April 9, 1937
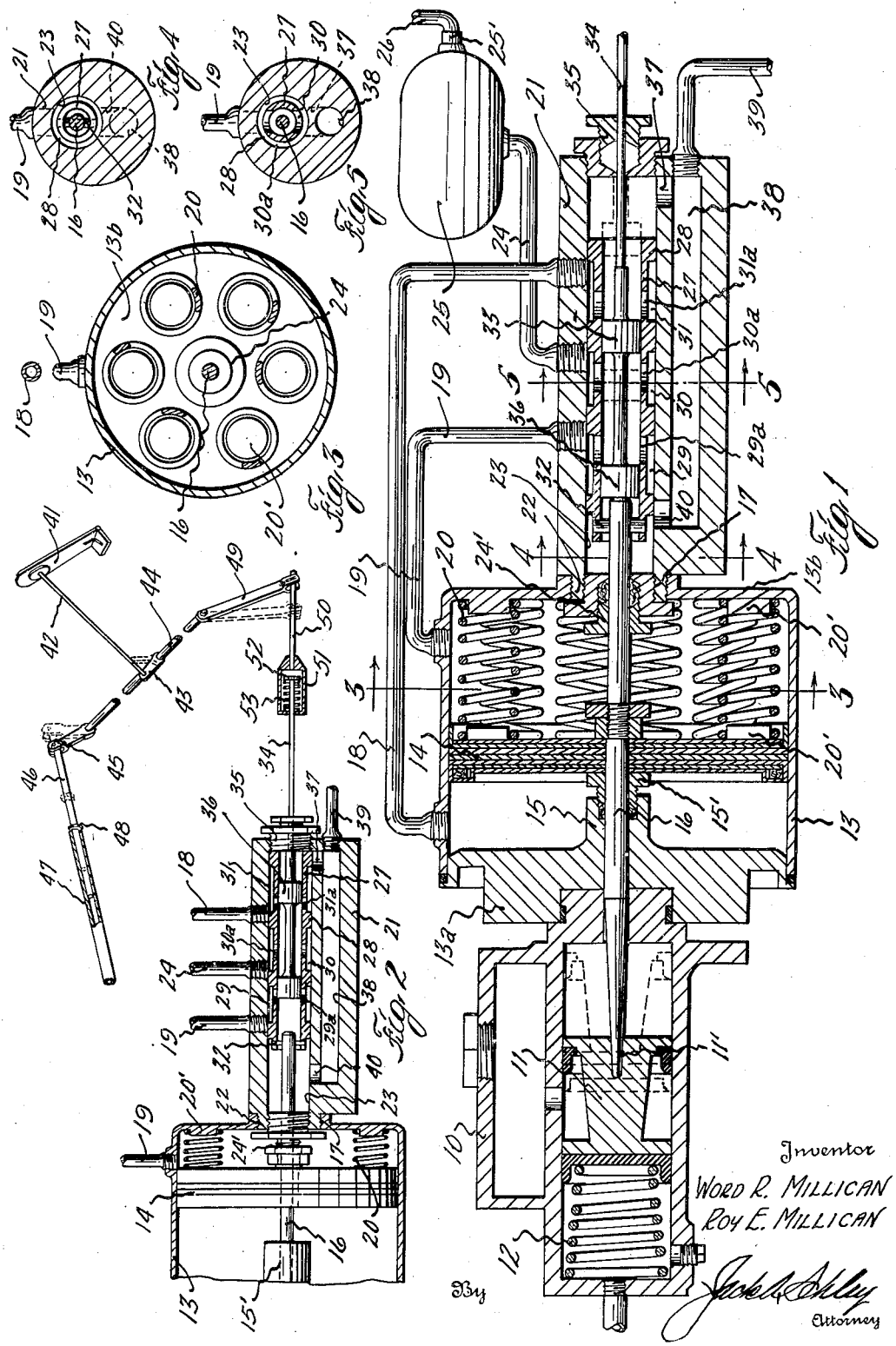
Inventor
WORD R. MILLICAN
ROY E. MILLICAN
By
Jack A. Ohley
Attorney Patented Mar. 19, 1940

2,194,197

UNITED STATES PATENT OFFICE 2,194,197

BRAKE OPERATING MECHANISM

Word R. Millican and Roy E. Millican, Mesquite, Tex.

Application April 9, 1937, Serial No. 135,896

12 Claims. (Cl. 192—3)

This invention relates to new and useful improvements in brake operating mechanism.

One object of the invention is to provide improved means for operating the brakes of a vehicle, whereby the operator of said vehicle may control the application of the brake with minimum effort and inconvenience to him.

An important object of the invention is to provide an improved brake operating mechanism which is controlled by the usual fuel accelerator, whereby the usual brake pedal, together with the inconvenience of depressing the same to actuate the brakes, is entirely eliminated.

Another object of the invention is to provide a fluid actuated member for operating the brakes of a vehicle with improved means for controlling the flow of fluid to either side of the member for actuating the same; the use of said fluid actuated member making for a smooth and even application of the brakes of said vehicle.

Still another object of the invention is to provide an improved brake operating mechanism which is controlled by the usual foot accelerator which is constructed so that its movement includes a braking range and a fuel supply range, the former being at the upper end of the movement of the accelerator, whereby when said accelerator is at its uppermost position, the brake of the vehicle is applied; depression of the accelerator gradually releases the brake until the fuel supply range is reached at which time, the brake is completely released and cannot be again applied until the accelerator has moved upwardly out of the fuel supply range, thereby making it impossible to increase the fuel supply and apply the brakes simultaneously.

A still further object of the invention is to provide a fluid actuated piston movable within a cylinder for operating the brakes of a vehicle, with an improved control valve for directing pressure fluid to either side of the piston to move the same in accordance with the position of the accelerator pedal of the vehicle; the structure of the mechanism being such that the pressure fluid may be supplied from the crank case of the vehicle, whereby an auxiliary fluid system for the piston is unnecessary.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a longitudinal sectional view of a brake operating mechanism, constructed in accordance with the invention, and showing the same in brake applying position;

Figure 2 is a reduced sectional view, showing the position of the parts with the brakes released;

Figure 3 is a transverse, vertical, sectional view, taken on the line 3—3 of Figure 1;

Figure 4 is a transverse, vertical, sectional view, taken on the line 4—4 of Figure 1; and Figure 5 is a transverse, vertical, sectional view, taken on the line 5—5 of Figure 1.

In the drawing, the numeral 10 designates the master cylinder of a hydraulic braking system such as is in common use on motor vehicles. The cylinder has a piston 11 movable therein and a coiled spring 12 exerts its pressure to hold the piston toward one end of the cylinder. When in such position, shown by dotted lines in Figure 1, the brake of the vehicle is released. Movement of the piston to the position shown in full lines in this figure forces brake fluid to the wheels of the vehicle to apply the brake. The above is of the usual construction, forming no part of the present invention and is therefore, subject to variation, having been described and shown merely for the sake of clarity.

For actuating the piston 11, which will be hereinafter referred to as the brake piston, an enlarged cylinder 13 is provided. This cylinder has one end 13a suitably fastened to the end of the master cylinder 10 and a piston 14 is movable therein, between an inwardly extending collar 15 which is preferably formed integral with the end wall 13a, and the opposite wall 13b of said cylinder 13. An elongate actuating rod 16 extends axially through and is secured to the piston 14. One end of the rod passes through the collar 15 and into the master cylinder 10, being arranged to engage an axial recess 11' in the brake piston 11, while the other end of the rod extends through an axial opening 17 formed in the end wall 13b of the cylinder 13. A suitable packing gland 15' is mounted in the collar 15 and surrounds the rod. When the piston is in the position shown in Figure 1, the rod is in engagement with the brake piston and is holding the same in this position under compression of the coiled spring 12, whereby the vehicle brake is applied.

For moving the piston 14, a pressure fluid supply line 18 is connected to one end of the cylinder 13. Manifestly, the admittance of a pressure fluid to this side of the piston will move the piston to the position shown in Figure 2, which will move the end of the rod 16 away from the brake piston 11 and permit the spring 12 to move said brake piston to brake releasing position. So long as pressure is maintained in the line 18 and the end of the cylinder to which said line is connected, the brake is released.

In order to return the piston 14 to the position against the gland 15' to apply the brake, a second fluid supply 19 is connected to the cylinder adjacent the end 13b. Introduction of pressure fluid through this line, with a simultaneous bleeding of the line 18, will return the piston to its original position. Of course, as the piston 14 travels from its extreme end position the braking is gradual and if the piston moves slowly the brake is applied slowly, and similarly a rapid movement of the piston results in a rapid application of the brakes. The use of a pressure fluid for controlling the movement of the piston 14 provides a smooth operation, bringing about smoothness in the application of the brakes.

From the above, it will be seen that the movement of the piston is entirely controlled by fluid pressure. To assure the piston 14 remaining in the position shown in Figure 1 to hold the brake applied in the event that the vehicle remains idle for a length of time, and to obviate danger of the release of the brake if a leak should occur in the supply line 19, a plurality of coiled springs 20 are interposed between the piston 14 and end wall 13b. The ends of the springs have their ends surrounding lugs 20' formed on the piston and wall, which prevents their lateral displacement, and said springs exert their pressure to hold the piston 14 in position shown in Figure 1, with the piston engaging the gland 15'. When the fluid pressure is introduced into the cylinder 13 through the line 19 to apply the brake and the vehicle remains standing for a length of time, then if a leak in said line should occur, the springs 20, having a greater pressure than the single spring 12 which acts against the piston 11, will hold the brake applied.

For controlling the admission of pressure fluid to the lines 18 and 19 to control the movement of the piston 14, a control valve assembly is provided. This valve comprises a cylindrical housing 21 having an externally threaded nipple 22 at one end thereof. The nipple is screwed into the opening 17 in the end wall of the cylinder 13, whereby said housing is supported on the cylinder. The piston rod 16 which extends through the opening 17 also extends through the nipple and into a longitudinal bore 23 formed in the housing 21. A suitable stuffing box 24' surrounds the rod 16 and is mounted within the nipple.

The pressure fluid line 18 leading from the cylinder 13 has its other end connected in the housing so as to communicate with the bore 23, while the other end of the fluid line 19 is similarly connected in the housing. Thus, both lines 18 and 19 have communication with the bore of the housing. A supply line or tube 24 has its lower end leading from the bore 23, being connected at a point between the lines 18 and 19 (Figure 1). The other end of the line 24 is connected to a storage chamber 25 which is supplied with fluid under pressure by a pipe 26 which leads from the usual oil pump (not shown) of the motor vehicle. A check valve 25' is connected in the line 26 and permits the fluid to enter the chamber while preventing its escape therefrom. Therefore, the storage chamber is maintained under pressure and assures sufficient pressure for efficient operation at all times. Obviously, the fluid under pressure flows from chamber through the supply line 24 into the bore 23, from where it may flow to the lines 18 and 19.

For conducting the fluid to either one or the other of the lines 18 and 19 in order to move the piston 14 and brake piston 11, a sleeve 27 is mounted to undergo movement within the bore 23 of the housing. The sleeve is open at each end and is formed with a plurality of collars 28, which are preferably integral therewith and which are spaced throughout the length of the sleeve. The collars have a diameter substantially equal to the diameter of the bore so as to have a snug sliding fit within said bore. The provision of the collars spaces the surface of the sleeve from the wall of the bore 23 whereby a trio of annular channels 29, 30 and 31 are formed between the sleeve and bore. The inner end of the sleeve is connected by a radial pin 32 with the end of the piston rod 16 so that when the piston 13 and rod 16 are moved, the sleeve 27 is moved within the bore.

With the brake applied and the piston 13 in the position shown in Figure 1, the end of the annular channel 29 is beneath the line 19, the end of the channel 30 is beneath the supply line 24 and the channel 31 is beneath the line 18. Radial ports 29a are located diametrically opposite each other at one end of the channel 29 and establish communication between the channel and bore of the sleeve. Similar ports 30a are located centrally of the channel 30, while other ports 31a are disposed at one end of the channel and thus, all of the channels communicate with bore of the sleeve. Therefore, the fluid from the supply line 24 flows into the central annular channel 30, then into the bore of the sleeve 27, from which it flows to one or the other of the channels 29 or 31 to supply either the line 18 or 19.

For controlling the flow of fluid from the central channel 30 to the other channels, a sliding valve member 33 is mounted within the sleeve. This member includes an actuating stem 34 which projects through a stuffing box 35 at the outer end of the bore 23. A pair of circular heads 36 are mounted on the stem in spaced relation and have a sliding fit within the sleeve 27.

When the brake is applied, the parts are in the position shown in Figure 1, with the inner head 36 of the valve member engaging the end of the rod and the other head positioned between the ports 30a and 31a of the channels 30 and 31 respectively. At this time, the pressure fluid from the supply line 24 flows into the central annular channel 30, through the ports 30a and into the bore of the sleeve 27. From the bore, the fluid flows through the ports 29a, channel 29 and into the fluid line 19, which conducts it to the end 13b of the cylinder to hold the piston 14 against the collar 15. The fluid from the other side of the piston has drained through the line 18, channel 31 into the interior of the sleeve 27, from where it flows from the open end thereof into bore 23 of the housing. From the bore, said fluid passes through an opening 37 which communicates with a longitudinal drain passage 38 formed in the housing. A suitable return line 39 is connected to the end of the passage to return the fluid to the source of supply. It is noted that if a leak should occur at this time, in the line 19 or in the cylinder 13 and the fluid escape therefrom, the springs 20 would hold the cylinder against the collar 15 with the brake remaining applied.

When it is desired to release the brake and move the piston 14 to its opposite position, or that shown in Figure 2, the valve member 33 is moved within the sleeve to move its inner head away from the piston rod 16. Movement of the valve member causes the heads to move into the position shown in dotted lines in Figure 1, with the inner head in alinement with the ports 30a, although not completely covering the same. The other head has moved to the outer end of the sleeve and therefore, a communication is established between the ports 30a and the ports 31a, whereby the pressure fluid may flow from the supply line 24 to the line 18. At the same time, the ports 29a leading from the line 19 are in communication with the bore 23 through the open end of the sleeve 27, thereby permitting fluid to drain from the line 19 into the bore 23 and then through an opening 40 which leads to the drain passage 38.

As the pressure fluid is conducted to the cylinder through the line 18, the piston 14 is moved from the position shown in Figure 1 to the position shown in Figure 2. As this occurs, the sleeve 27 is moved outwardly in the bore 23 because of its connection through the pin 32 with the piston rod 16. This movement of the sleeve causes the parts to assume the position shown in Figure 2, with the parts 29a and 30a completely uncovered, and the ports 31a partially covered by the outer head of the valve member. The communication between the line 24 and line 18 has been maintained and is maintained so long as the vehicle brake is released. Therefore, the pressure is always held on the piston 14 when the brake is released and danger of leaks causing unintended application of the brakes is obviated.

To again completely apply the brakes, the valve member is moved inwardly to again establish communication between the line 24 and line 19, while the line 18 is permitted to drain, as has been explained.

From the above, it will be seen that the piston 14 may be moved from complete brake releasing position to complete brake applying position by moving the valve member 33 from one extreme position to the other within the bore 23. There are many instances where the brake may be only partially applied and therefore, the valve member and sleeve 27 are so arranged that they may be stopped in any of their intermediate positions, and the amount of pressure applied to the brake is dependent upon the position of the parts within the bore. Assuming the parts to be in brake releasing position as shown in Figure 2, and supposing that it is only necessary to apply the brake partially, then the member 33 is moved only a part of the distance through the bore so that said valve member travels forwardly within the sleeve, whereby the outer head 36 thereof uncovers a portion of the port 29a and establishes communication between the supply line 24 and line 19. For example, it will be assumed a one eighth inch area of the port 29a is uncovered which restricts the flow of fluid through the line 19. Since the heads 36 are spaced the same distance apart on the member as the ports 29a and 31a on the sleeve, uncovering of one eighth inch of the port 29a to permit flow into the line 19 causes a similar uncovering of the port 31a to permit an exhaust of the fluid from the piston cylinder through the line 18.

As the fluid flows into the line 19 the piston 14 is moved which imparts a movement to the sleeve 27. This movement of the piston and sleeve continues until the ports 29a and 30a move into alinement with the heads 36, which cuts off the flow of fluid through the lines 18 and 19 and halts the piston in its intermediate position, where said piston remains until the valve member 33 is again moved. Therefore, it is evident that any amount of pressure may be applied to the brake piston 12 by properly manipulating the valve member 33. The piston 14 may be halted in any intermediate position between its limits of movement and therefore, the same control of the braking may be had as with the usual brake pedal.

Any suitable means may be employed to actuate the valve member 33, but it is preferable that it be controlled by the usual foot accelerator pedal 41 of the vehicle, in which case the usual brake pedal may be eliminated. As diagrammatically shown in Figure 2, the underside of the accelerator pedal has a rod 42 attached thereto, and the lower end of this rod is pivoted to an arm 43, which arm is secured on a rotatable shaft 44. One end of the shaft has an upwardly extending arm 45 fastened thereon and this arm is fastened to the upper end of a rod 46. The lower end of the rod telescopes a sleeve 47 which is connected with the fuel throttle of the motor. A nut 48 surrounds the rod 46 and is arranged to engage the end of the sleeve 47 to impart movement thereto. Obviously, when the nut is in the position shown in dotted lines (Figure 2) and spaced from the end of the sleeve it may undergo a limited movement with relation to the sleeve.

The other end of the rotatable shaft 44 has a depending lever 49 secured thereto and the lower end of the lever is pivoted to the outer end of an operating rod 50, which has its other end secured to a housing 51. The outer end of the stem 34 of the valve member extends into the housing and has a collar 52 formed thereon. A coiled spring 53 is interposed between the collar and end wall of the housing and when there is no resistance to the movement of the stem, the spring connects the stem and rod 50 to cause them to move as a unit. However, the stem and rod may move with relation to each other under tension of said spring.

With the brake applied, the arm 45 and lever 49 are in the position shown in dotted lines in Figure 2 with the nut 48 spaced from the end of the sleeve 47. As the pedal 41 is depressed, the shaft 44 is rotated in a counter-clockwise direction, swinging the lever 49 which moves the valve member 33 through the rod 50, housing 51 and stem 34. While the member is being moved the rod 46 is telescoping the sleeve but no movement is imparted to said sleeve because the nut 48 is not in engagement with the end thereof. Of course, as soon as said nut engages the sleeve 47, the fuel throttle is actuated and by this time the valve member has completed its movement with the outermost head engaging the end wall of the bore 23 (Figure 2). Continued rotation of the shaft 44 due to increase of fuel swings the lever 49 and moves the rod 50. This continued movement of the rod does not move the stem as the motion of the rod is taken up by the spring 53 within the housing 51, thereby permitting movement of the rod 50 relative of the stem 34 after the member 33 has moved its limit.

With such arrangement, the pedal 41 has a braking range and a fuel supply range and it is impossible to apply the brake while increasing the fuel supply. The movement of the pedal through the braking range is relatively small and no effort or exertion on the part of the operator is necessary. The usual brake pedal is entirely eliminated and the starting and stopping of the vehicle is consolidated in one control. Since the brake is automatically applied when the accelerator pedal is released, the danger of the operator leaving the vehicle without setting the brake is obviated.

What I claim and desire to secure by Letters Patent is:

1. A brake operating mechanism including, a cylinder, a fluid actuated piston movable within the cylinder and adapted to engage the brake operating means of a motor vehicle, a pressure fluid line connected to one end of the cylinder for conducting fluid to one side of the piston, a second pressure fluid line for conducting fluid to the other side of the piston, a supply line arranged to communicate with the fluid lines, a valve assembly for directing the flow of fluid from the supply line to one or the other of the fluid lines, said assembly including a movable sleeve connected with the piston, and a valve member slidable within the sleeve and coacting therewith to control the flow of fluid from the supply line to the fluid lines.

2. A brake operating mechanism including, a cylinder, a fluid actuated piston movable within the cylinder and adapted to engage the brake operating means of a motor vehicle, a pressure fluid line connected to one end of the cylinder for conducting fluid to one side of the piston, a second pressure fluid line for conducting fluid to the other side of the piston, a supply line arranged to communicate with the fluid lines, a valve assembly for directing the flow of fluid from the supply line to one or the other of the fluid lines, said assembly including a movable sleeve connected with the piston, a valve member slidable within the sleeve and coacting therewith to control the flow of fluid from the supply line to the fluid lines, and means for connecting the valve member to the foot accelerator of the vehicle whereby the flow of fluid to the cylinder is controlled by said accelerator.

3. A brake operating mechanism including, a cylinder, a fluid actuated piston movable within the cylinder and adapted to engage the brake operating means of a motor vehicle, a valve assembly for controlling the flow of fluid to the cylinder to move the piston in either direction, said assembly including a movable sleeve connected with the piston and controlled in its movement solely by the piston, and a piston type valve member slidable within the sleeve and coacting therewith to control the flow of fluid to the cylinder.

4. A brake operating mechanism for a motor vehicle including, a cylinder, a fluid actuated member movable in said cylinder and adapted to engage the operating means of the vehicle brake, said member being free from positive connection therewith, and means for supplying fluid under pressure from the motor of the vehicle to the ends of the cylinder on each side of the member whereby the member is moved to operate the braking means.

5. A brake operating mechanism including, a cylinder, a fluid actuated piston movable in said cylinder and having a piston rod adapted to engage the brake operating means of a motor vehicle, resilient means engaging one side of the piston and urging said piston to a position whereby the piston rod moves the brake operating means into braking position, means for conducting a pressure fluid to the opposite side of the piston to move the piston under compression of the resilient means to release the brakes, and a valve assembly including a movable valve member engaged by the piston for controlling the flow of fluid to the piston, whereby operation of the valve controls the movement of the piston.

6. A brake operating mechanism including, a cylinder, a fluid actuated piston movable in said cylinder and having a piston rod adapted to engage the brake operating means of a motor vehicle, resilient means engaging one side of the piston and urging said piston to a position whereby the piston rod moves the brake operating means into braking position, means for conducting a pressure fluid to the opposite side of the piston to move the piston under compression of the resilient means to release the brakes, a valve assembly including a movable valve member engaged by the piston for controlling the flow of fluid to the piston, whereby operation of the valve controls the movement of the piston, and means for connecting the valve member to the foot accelerator of the vehicle whereby the braking is entirely controlled by said accelerator and the usual foot pedal is eliminated.

7. A brake operating mechanism for motor vehicles including, a cylinder, a fluid actuated piston movable in said cylinder and adapted to engage the brake operating mechanism to move the same in a direction to apply the brakes, movement of the piston in the opposite direction disengaging the brake operating means and permitting release of the brakes, means for supplying pressure fluid to the cylinder for moving the piston, a valve assembly for controlling the supply of fluid to the cylinder and including a sleeve directly connected with the piston so as to move therewith, a valve member slidable within the sleeve and coacting therewith for controlling the flow through the valve, and means for connecting the valve member to the accelerator of the motor vehicle whereby the operation of the valve assembly is controlled by the accelerator and the usual brake pedal is eliminated.

8. A brake operating mechanism for a motor vehicle including, a cylinder, a fluid actuated piston movable in the cylinder and having a piston rod which projects from each end of the piston, one end of said rod being adapted to engage the brake operating means of the motor vehicle, means for supplying a pressure fluid to the cylinder to move the piston, and a valve assembly adjacent the cylinder for controlling the fluid supplied to the cylinder and including a coacting valve member and sleeve, the latter being connected to the other end of the piston rod and the former being actuated by the operator from a remote point, the valve member having a tight sliding fit within the sleeve, whereby a coaction between the control valve and piston is had.

9. A brake operating mechanism for a motor vehicle including, a cylinder, a fluid actuated piston movable in the cylinder and having a piston rod which projects from each end of the piston, one end of said rod being adapted to engage the brake operating means of the motor vehicle, means for supplying a pressure fluid to the cylinder to move the piston, a valve assembly adjacent the cylinder for controlling the fluid supplied to the cylinder and including a coacting valve member and sleeve, the latter being connected to the other end of the piston rod, whereby a coaction between the control valve and piston is had, and means for connecting the valve member to the foot accelerator of the vehicle whereby the braking is controlled by the movement of said accelerator.

10. A brake operating mechanism for a motor vehicle including, a cylinder, a fluid actuated piston movable in the cylinder and having a piston rod which projects from each end of the piston, one end of said rod being adapted to engage the brake operating means of the motor vehicle, means for supplying a pressure fluid to the cylinder to move the piston, resilient means within the cylinder and engaging the piston and constantly urging the piston to a position so that its rod moves the operating means to braking position, and a valve assembly adjacent the cylinder for controlling the fluid supplied to the cylinder and including a coacting valve member and sleeve, the latter being connected to the other end of the piston rod, whereby a coaction between the control valve and piston is had.

11. A brake operating mechanism for motor vehicles including, a cylinder, a fluid actuated piston movable in said cylinder and adapted to engage the brake operating mechanism to move the same in a direction to apply the brakes, movement of the piston in the opposite direction disengaging the brake operating means and permitting release of the brakes, means for supplying pressure fluid to the cylinder for moving the piston, resilient means within the cylinder engaging the piston and urging the same to its brake applying position, a valve assembly for controlling the supply of fluid to the cylinder and including a sleeve connected with the piston so as to move therewith, and a valve member slidable within the sleeve and coacting therewith for controlling the flow through the valve.

12. The combination with a motor vehicle having a hydraulic braking mechanism and also having a foot pedal for controlling the fuel supply to the vehicle, of a brake actuating apparatus having a piston directly connected with a sleeve member within which a valve member is movable for operating the hydraulic braking mechanism of said vehicle, a connection between the foot pedal of the vehicle and the valve member, whereby movement of the pedal operates the apparatus, said connection being so arranged that a predetermined movement of the pedal imparts a relative movement to the valve member to apply the brake in accordance to the movement of the pedal, whereby said pedal controls the braking as well as the fuel supply and the usual brake pedal is eliminated.

WORD R. MILLICAN.
ROY E. MILLICAN.